(12) United States Patent
Sun et al.

(10) Patent No.: US 9,903,380 B2
(45) Date of Patent: Feb. 27, 2018

(54) FAN

(75) Inventors: Chi Ping Sun, Hong Kong (CN); Fang Yi Li, Shenzhen (CN); Siu Chung Yip, Hong Kong (CN)

(73) Assignee: JOHNSON ELECTRIC S.A., Murten (CH)

( * ) Notice: Subject to any disclaimer, the term of this patent is extended or adjusted under 35 U.S.C. 154(b) by 1087 days.

(21) Appl. No.: 13/178,664

(22) Filed: Jul. 8, 2011

(65) Prior Publication Data

US 2012/0009863 A1 Jan. 12, 2012

(30) Foreign Application Priority Data

Jul. 8, 2010 (CN) .......................... 2010 1 0223036

(51) Int. Cl.
*F04D 27/00* (2006.01)
*H02P 6/06* (2006.01)

(52) U.S. Cl.
CPC .............. *F04D 27/004* (2013.01); *H02P 6/06* (2013.01)

(58) Field of Classification Search
CPC .................................................... F04D 27/004
USPC ................................... 454/75, 341, 229, 228
See application file for complete search history.

(56) References Cited

U.S. PATENT DOCUMENTS

| | | | | |
|---|---|---|---|---|
| 4,701,981 A * | 10/1987 | Leifeld | .................. | D01G 23/08 19/105 |
| 4,978,896 A | 12/1990 | Shah | | |
| 5,447,414 A * | 9/1995 | Nordby et al. | .................. | 417/20 |
| 6,185,481 B1 * | 2/2001 | Kondou | ............. | H05K 7/20154 165/231 |
| 6,969,234 B2 * | 11/2005 | Lin | ........................... | G06F 1/20 257/E23.099 |
| 7,160,080 B2 * | 1/2007 | Lin | ....................... | F04D 29/582 415/177 |
| 7,244,106 B2 * | 7/2007 | Kallman | .............. | G05D 7/0676 417/44.1 |
| 7,657,161 B2 | 2/2010 | Jeung | | |
| 7,915,847 B2 | 3/2011 | Jeung | | |
| 8,092,645 B2 * | 1/2012 | Yip | ................... | H01L 21/67132 156/707 |

(Continued)

FOREIGN PATENT DOCUMENTS

| | | |
|---|---|---|
| CN | 101377155 A | 3/2009 |
| CN | 101647193 A | 2/2010 |

(Continued)

*Primary Examiner* — Steven B McAllister
*Assistant Examiner* — Samantha Miller
(74) *Attorney, Agent, or Firm* — Muncy, Geissler, Olds & Lowe, P.C.

(57) ABSTRACT

A fan for a ventilation system has a motor, a motor speed control unit and a controller arranged to control the motor to maintain the quantity of air flowing through the system constant. The controller compares the actual motor current with an expected motor current for the fan operating at the desired air quantity and motor speed to determine an actual system operating condition. When the difference between the actual motor current and the expected motor current is greater than a preset range, the motor speed is adjusted to a new motor speed determined based on the actual system operating condition. The system operating conditions may change due to changes in the static pressure of the system such as changes to the ventilation ducting or external wind pressure.

8 Claims, 2 Drawing Sheets

(56) References Cited

U.S. PATENT DOCUMENTS

| | | |
|---|---|---|
| 8,297,068 B2 | 10/2012 | Yokouchi et al. |
| 2007/0256823 A1* | 11/2007 | Molt .................... F28D 1/0535 |
| | | 165/175 |
| 2008/0119126 A1* | 5/2008 | Shizuo et al. .................. 454/75 |
| 2008/0188173 A1* | 8/2008 | Chen et al. ................... 454/239 |
| 2010/0101265 A1 | 4/2010 | Yokouchi et al. |
| 2010/0256821 A1 | 10/2010 | Jeung et al. |

FOREIGN PATENT DOCUMENTS

| | | |
|---|---|---|
| JP | 38-026908 | 12/1963 |
| JP | 63-194557 A | 12/1988 |
| JP | H02266862 A | 10/1990 |
| JP | 2002-165415 A | 6/2002 |
| JP | 2007-14522 A | 1/2007 |
| JP | 2009-100572 A | 5/2009 |

* cited by examiner

FAN

CROSS REFERENCE TO RELATED APPLICATIONS

This non-provisional patent application claims priority under 35 U.S.C. § 119(a) from Patent Application No. 201010223036.8 filed in The People's Republic of China on Jul. 8, 2010.

FIELD OF THE INVENTION

This invention relates to a fan for use in a constant air flow system and in particular, to a motor and controller of such a fan.

BACKGROUND OF THE INVENTION

Ventilation systems and air conditioning systems commonly use a fan comprising a fan blade or impeller driven by an electric motor to create the air flow and adjust the air flow by changing the speed of the motor. However, such speed changes are usually a 2 or 3 step change, manually selected by an operator. When the static pressure of the system varies, which may be caused by changes in the ductwork of the system, in exterior wind pressure or the like, the volume of air moved by the system also varies. However, for certain installations it is desired to keep the volume of air flowing through the system constant, regardless of static pressure variations.

The present invention aims to provide a new method to keep the volume of the air flow constant.

SUMMARY OF THE INVENTION

Accordingly, in one aspect thereof, the present invention provides a fan for supplying a desired quantity of air through a ventilation system, comprising: a motor for driving blades of the fan; a power supply for supplying power to the motor; a current sensor for sensing actual motor current; a constant speed control unit for operating the motor at a desired speed by regulating the power supply and having a speed sensor for measuring the actual speed of the motor; a controller for determining the desired speed of the motor based on the desired air quantity and the actual motor current and actual motor speed, the controller comprising: an output providing a signal for the speed control unit indicative of the desired motor speed; and means for generating the desired motor speed and expected motor current based on the desired air quantity, and regenerating the desired motor speed and expected motor current when the difference between the actual current and expected current is greater than a preset range.

Preferably, the speed control unit has a closed loop feedback to control the actual speed of the motor to the desired speed.

Preferably, the controller comprises a memory unit that stores values of fan performance values which are used by the means for generating the desired motor speed and expected motor current.

Preferably, the controller comprises a memory unit that stores a table with values of fan performance values and corresponding values of motor current and motor speed and the desired motor speed and the expected motor current are determined by looking up the table.

Preferably, the power supply comprises an inverter and the inverter is controlled by PWM signals generated by the speed control unit.

Preferably, the motor is a BLDC motor.

According to a second aspect, the present invention also provides a method of operating a fan of a constant flow ventilation system having a motor, a power supply, a current sensor, a constant speed control unit, including a speed sensor and a controller, the method comprising the steps of: receiving a desired air quantity value from an operator, determining a desired motor speed and an expected motor current for the motor based on assumed system operating conditions, operating the motor at the desired motor speed, comparing the expected motor current with an actual motor current measured by the current sensor and whenever the difference between the expected motor current and the actual motor current is greater than a preset range, using the actual motor current and motor speed to determine actual system operating conditions and adjusting the desired motor speed and expected motor current based on the actual system operating conditions.

Preferably, the step of determining the desired motor speed and expected motor current includes looking up a table of system operating values.

Preferably, the step of determining the actual system operating conditions includes looking up the table of system operating values.

Preferably, the speed of the motor is controlled by controlling the amount of power supplied to the motor and using the amount of the power supplied to the motor to determine the actual system operating conditions by finding a current operating point on a fan curve from the table of system operating values.

Preferably, the step of determining the desired motor speed and expected motor current includes interpolating a value between two values of the lookup table

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

The term air quantity as used through out the specification and claims refers to the quantity or volume of air flowing through the system in a given period of time, i.e. a volume flow rate such as cubic feet per minute (CFM) or liters per second (l/s).

Figure 1:
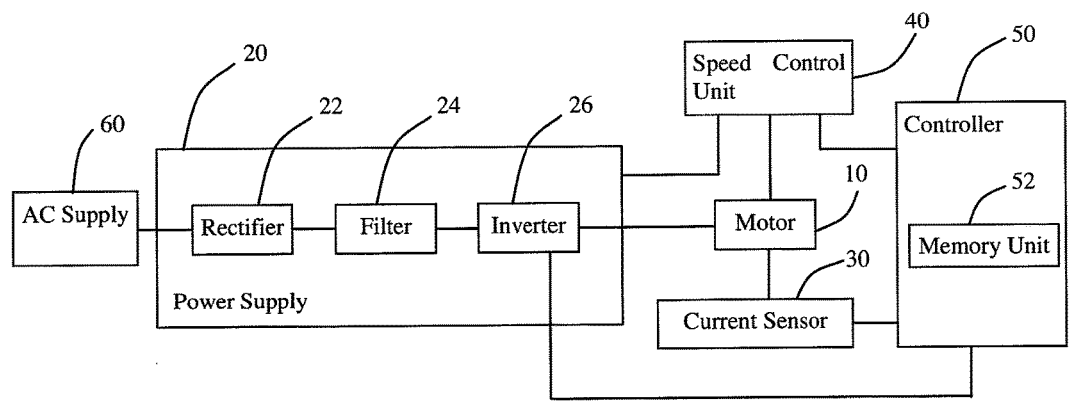
FIG. 1 is a block diagram of a control unit for a fan in accordance with the preferred embodiment of the present invention.

FIG. 1 illustrates a block diagram of a control unit for a fan for an adjustable air flow system, such as a ventilation system, according to the preferred embodiment of the present invention. The fan comprises a fan blade or impeller (not shown), driven by an electric motor 10 and a control unit regulating operation of the motor. The control unit comprises: a power supply 20 for supplying power to the motor 10, a current sensor 30 for measuring the actual motor current, a speed control unit 40, and a controller 50. The speed controller includes a speed sensor for measuring the actual speed of the motor to provide a closed loop feedback for the speed controller.

The motor 10 is preferably a BLDC motor which has a stator with stator windings, a permanent magnet rotor magnetically coupled to the stator, and a sensor for detecting changes in the magnetic field of the rotor. However, the present invention is not limited to using a BLDC motor.

The power supply 20 comprises a rectifier 22 for converting an AC voltage from an AC power source 60 to a DC voltage, a filter 24 for smoothing the DC voltage, and an inverter 26 for supplying power to the stator windings of the motor 10. The inverter 146 has switching units arranged in a bridge circuit and is powered by the smoothed DC voltage. The switching units are driven by PWM signals provided by the speed control unit 40 so as to apply power to the stator windings in a predetermined manner to control the speed of the motor.

The controller 50 is adapted to keep the system operating in such a manner to keep the air quantity at the desired value. The controller determines a desired motor speed and an expected motor current in response to a selected desired air quantity. The desired motor speed is communicated to the speed control unit by a desired speed signal to operate the motor at the desired speed. The controller checks the actual motor current against the expected motor current. If the desired motor current and the actual motor current are approximately equal, the controller makes no adjustment to the desired motor speed. Should the actual motor current and the expected motor current be different by more that a predetermined amount, the controller will determine a new desired motor speed and expected motor current.

Figure 2:
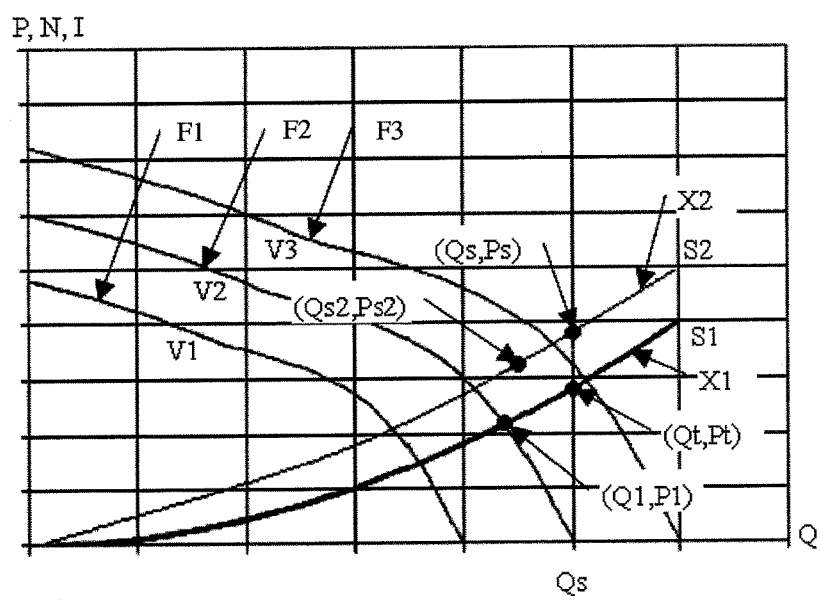
FIG. 2 shows fan performance curves and system curves according to the preferred embodiment of FIG. 1.

The preferred method of determining the desired motor speed and expected motor current will be described now, with reference to FIGS. 2 & 3. FIG. 2 shows fan performance curves and system curves of a ventilation system as an example of the present invention. The horizontal axis represents air quantity and the vertical axis represents static pressure. Curves F1, F2, F3 are fan performance curves showing characteristics of the fan when the motor 12 is powered by voltages V1, V2, V3 respectively. The fan performance curves can be determined during manufacture or before the fan is installed. Curves X1, X2 are system curves showing characteristics of different operating conditions of the system S1, S2. Points in the system curves are called system operating points. The intersection (Q1, P1) between the system curve X1 and the fan performance curve F2 indicates that in order for the system with characteristic S1 to output air flow of at least Q1 cfm, the voltage supplied to the motor 12 must be a value of "V2" or greater.

Figure 3:
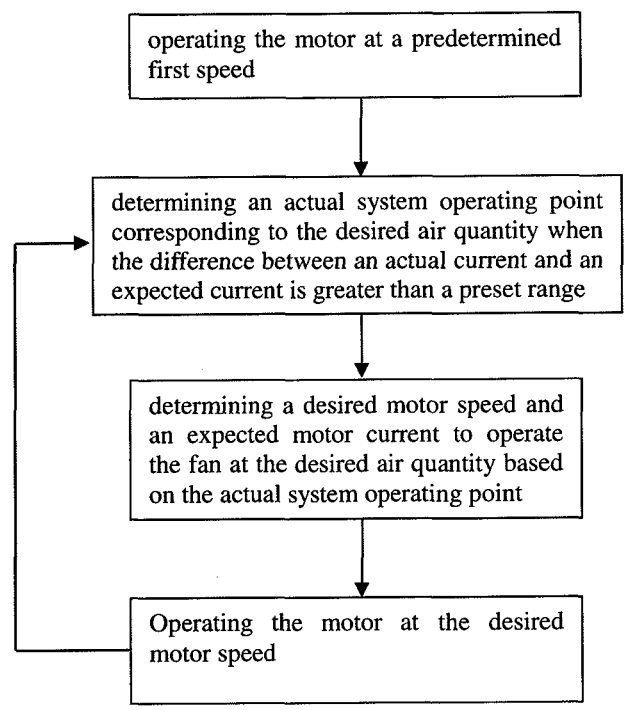
FIG. 3 is a brief flow chart of a method of controlling the fan of FIG. 1.

FIG. 3 is a flow chart of an air quantity control method. Firstly, the motor 10 is controlled to operate at a predetermined first speed Ns1 to make the system output a desired air quantity Qs.

While the first speed Ns1 may be a predetermined set speed based on the selected air quantity or otherwise, preferably, the first speed Ns1 is determined in an automatic calibrating process which is performed after the system is installed. The system at this time is assumed to be operating as system S1 with curve X1. A reference air quantity Qt is inputted by the installer via a user interface, then the system operation point (Qt, Pt) and values of motor operation parameters corresponding to the air quantity Qt are determined. The process includes the following steps:

A1) determining the motor speed and the voltage corresponding to the system operating point (Qt, 0) based on a FM table stored in a memory unit 52 of the controller 50. The FM table contains sets of data including values of fan performance parameters and values of motor operating parameters corresponding to the values of fan performance parameters. The fan performance parameters include static pressure P and air quantity Q. The motor operating parameters include motor speed N, motor current I, voltage V and power W supplied to the motor. Each set of values of static pressure P, air quantity Q and voltage V represents a point on a fan performance curve and corresponds to a unique set of values of speed N, current I and power W in the FM table. Therefore, the speed and voltage corresponding to the system operating point (Qt, 0) can be determined by looking up the FM table.

A2) supplying the motor 10 with the determined voltage and detecting the actual current I1 passing through the motor.

A3) determining the system operating point (Q1, P1) corresponding to the detected current I1 based on the FM table. If the current I1 is stored in the FM table, the system operating point (Q1, P1) can be directly determined by looking up the FM table. If the current I1 is not stored in the FM table, the system operating point (Q1, P1) can be determined by looking up the table plus interpolation.

A4) calculating a constant K1 of the system S1 by the equation:

$$K1=Q1/\sqrt{(P1)};$$

A5) calculating the static pressure Pt corresponding to the reference air quantity Qt by the equation:

$$Pt=(Qt/K1)^2$$

A6) determining the values of current It and speed Nt corresponding to the system operating point (Qt, Pt) based on the FM table. The current It and speed Nt can be directly determined by looking up the table or can be determined by looking up the table plus interpolation.

In this embodiment, the reference air quantity Qt may be set to equal to the desired air quantity Qs, thus the current It and the speed Nt equal to a first current Is1 and the first speed Ns1.

When the reference air quantity Qt does not equal the desired air quantity Qs, the nearest reference Qt operating point may be used, preferably the nearest Qt having a higher air quantity than the desired air quantity Qs. Alternatively, the first speed Ns1 and the first current Is1 can be obtained based on the speed Nt and the current It in the same proportion as the ratio between the desired air quantity Qs and the reference air quantity Qt.

Secondly, the actual current Is2 passing through the motor 10 is measured, then the actual current Is2 and the first current Is1 corresponding to the desired air quantity Qs are compared. If the difference between the current Is2 and the current Is1 is greater than a preset range, an actual system operating point (Qs, Ps) corresponding to the desired air quantity Qs is determined.

The fact that the difference between the actual current Is2 and the first current Is1 is beyond a preset range means that the air quantity output by the current system deviates from the desired air quantity Qs. It also means that the system S1 varies, for example, varies to the system S2, and the system curve varies from curve X1 to curve X2. Therefore the values of motor operating parameters need to be adjusted so as to make the current system S2 output the desired air quantity Qs.

The actual system operating point (Qs, Ps) can be determined by the following steps:

B1) determining the values (Qs2, Ps2) of the fan performance parameters corresponding to the detected current Is2 based on the FM table;

B2) calculating the constant K2 of the system S2 by the following equation:

$$K2=Qs2/\sqrt{(Ps2)};$$

B3) calculating the static pressure Ps corresponding to the desired air quantity Qs by the following equation:

$$Ps=(Qs/K2)^2$$

Thirdly, the value Ws2 of power to be supplied to the motor 10 and a second speed Ns2 of the motor 10 corresponding to the actual system operating point (Qs, Ps) are determined based on the FM table. Understandably, the power Ws2 and the second speed Ns2 can be directly determined by looking up the table or can be determined by looking up the table plus interpolation.

Fourthly, the motor 10 is supplied with the power Ws2 and is controlled to operate at the second speed Ns2, which makes the system S2 output the desired air quantity Qs. Preferably, the power Ws2 can be achieved by adjusting the duty cycle of the PWM signal provided to the inverter 26.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A fan for supplying a desired quantity of air through a ventilation system, comprising:
    a motor for driving blades of the fan;
    a power supply for supplying power to the motor;
    a current sensor for sensing actual motor current;
    a constant speed control unit for operating the motor at a desired speed by regulating the power supply and having a speed sensor for measuring the actual speed of the motor; and
    a controller for determining the desired speed of the motor based on the desired air quantity and the actual motor current and actual motor speed, the controller comprising: an output providing a signal for the speed control unit indicative of the desired motor speed; and means for generating the desired motor speed and expected motor current based on the desired air quantity, and determining an actual system operating point corresponding to the desired air quantity and then regenerating the desired motor speed and expected motor current when the difference between the actual current and expected current is greater than a preset range,
    wherein the controller comprises a memory unit that stores a table with values of fan performance parameters and corresponding values of motor current and motor speed and the desired motor speed and the expected motor current are determined by looking up the table, and
    wherein the fan performance parameters comprise static pressure and corresponding air quantity, a static pressure corresponding to the desired quantity of air at the ventilation system is calculated based on the fan performance parameters, and the desired motor speed and expected motor current is regenerated by the controller based on the calculated static pressure and corresponding the desired quantity.

2. The fan of claim 1, wherein the speed control unit has a closed loop feedback to control the actual speed of the motor to the desired speed.

3. The fan of claim 1, wherein the power supply comprises an inverter and the inverter is controlled by PWM signals generated by the speed control unit.

4. The fan of claim 3, wherein the motor is a BLDC motor.

5. A method of operating a fan of a constant flow ventilation system having a motor, a power supply, a current sensor, a constant speed control unit, including a speed sensor and a controller, the method comprising the steps of:
    receiving a desired air quantity value from an operator,
    determining a desired motor speed and an expected motor current for the motor based on assumed system operating conditions,
    operating the motor at the desired motor speed, and
    comparing the expected motor current with an actual motor current measured by the current sensor and whenever the difference between the expected motor current and the actual motor current is greater than a preset range, using the actual motor current and motor speed to determine actual system operating conditions and adjusting the desired motor speed and expected motor current based on the actual system operating conditions,
    wherein the desired motor speed and the expected motor current are determined using a look up table stored in a memory unit, the look up table storing values of fan performance parameters and corresponding values of motor current and motor speed, and
    wherein the fan performance parameters comprise static pressure and corresponding air quantity, a static pressure corresponding to the desired quantity of air at the ventilation system is calculated based on the fan performance parameters, and the desired motor speed and expected motor current is regenerated by the controller based on the calculated static pressure and corresponding the desired quantity.

6. The method of claim 5, wherein the step of determining the actual system operating conditions includes looking up the table of system operating values.

7. The method of claim 6, wherein the speed of the motor is controlled by controlling the amount of power supplied to the motor and using the amount of the power supplied to the motor to determine the actual system operating conditions by finding a current operating point on a fan curve from the table of system operating values.

8. The method of claim 7, wherein the step of determining the desired motor speed and expected motor current includes interpolating a value between two values of the lookup table.

* * * * *